US006288564B1

(12) United States Patent
Hedberg (10) Patent No.: US 6,288,564 B1
(45) Date of Patent: Sep. 11, 2001

(54) LINE RECEIVER CIRCUIT WITH LINE TERMINATION IMPEDANCE (75) Inventor: Mats Hedberg, Haninge (SE)

(73) Assignee: Telefonaktiebolaget LM Ercisson, Stockholm (SE)

( * ) Notice: Subject to any disclaimer, the term of this patent is extended or adjusted under 35 U.S.C. 154(b) by 0 days.

(21) Appl. No.: 09/485,230

(22) PCT Filed: Aug. 18, 1998

(86) PCT No.: PCT/EP98/05249

§ 371 Date: Apr. 20, 2000

§ 102(e) Date: Apr. 20, 2000

(87) PCT Pub. No.: WO99/09728

PCT Pub. Date: Feb. 25, 1999

(30) Foreign Application Priority Data

Aug. 19, 1997  (DE) .............................. 197 35 982

(51) Int. Cl.$^7$ ................................ H03K 19/003
(52) U.S. Cl. ................ 326/30; 326/21; 326/86; 326/83
(58) Field of Search ................ 326/21, 30, 82, 326/83, 86

(56) References Cited

U.S. PATENT DOCUMENTS

| | | | |
|---|---|---|---|
| 5,173,698 | 12/1992 | Gulczynski | 341/158 |
| 5,243,229 | 9/1993 | Gabara et al. | 307/98 |
| 5,559,447 | 9/1996 | Rees | 326/30 |
| 5,726,582 | * 3/1998 | Hedberg | 326/30 |
| 5,936,429 | * 8/1999 | Tomita | 326/82 |
| 6,075,384 | * 3/2000 | Sim et al. | 326/86 |

FOREIGN PATENT DOCUMENTS 0 721 269 A2   7/1996  (EP) .
WO 95/24089    9/1995  (WO) .

OTHER PUBLICATIONS

Golzio, D., International Search Report, dated Feb. 24, 1999, International Application No. PCT/EP98/05249, pp. 1–2.

* cited by examiner

Primary Examiner—Michael Tokar
Assistant Examiner—Vibol Tan
(74) Attorney, Agent, or Firm—Jenkens & Gilchrist, A Professional Corporation (57) ABSTRACT A line receiver circuit is provided with a buffer section having an input for connection to a transmission line, and with a termination impedance section comprising a plurality of interconnected termination impedance elements for terminating the characteristic impedance of the transmission line. The circuit is further provided with a twin impedance section which is operable over a specified voltage range and comprises twin impedance elements, each corresponding to one of the termination impedance elements. A control section couples control signals to each of the twin impedance elements in order to maintain linear operation of the termination impedance section, as voltage level varies over the specified voltage range.

16 Claims, 6 Drawing Sheets

LINE RECEIVER CIRCUIT WITH LINE TERMINATION IMPEDANCE

The present invention relates to a line receiver circuit, comprising a buffer section having an input for connection with a transmission line and an output for providing data signals in accordance with signals received through the transmission line, and furthermore comprising termination impedance means connected with the input of said buffer section, for terminating the characteristic impedance of the transmission line.

The transmission of information signals over transmission lines with high speed requires that at the receiving side of the transmission line a termination impedance is provided which matches the characteristic impedance of the transmission line. The matched termination of the line is the more important the higher the band width of the transmitted signals is. In order to keep the design of a line receiver circuit as compact as possible, the termination impedance can be an integral part of this circuit, and can, e.g. be integrated with the remaining sections of the circuit of the same semiconductor chip.

From WO 95/24089 a line receiver circuit of this kind is known which provides for electrical impedance matching at the receiving end of a transmission line. In order to enable this circuit to cooperate with various kinds of transmission lines with different characteristic impedances, the termination impedance means known from this document, comprises a controllable impedance element with an impedance control input for receiving an impedance control signal. Moreover, an impedance control signal generating means is provided, including a twin impedance element having an twin impedance control input and having electrical characteristics in predetermined relation to corresponding electrical characteristics of the termination impedance element. Means are provided for generating a control signal for the twin impedance element such that said twin impedance approximates a target value. The target value can be preset by means of connecting an external reference resistor. The control signal for controlling the impedance of the twin impedance element, is furthermore provided to the termination impedance element, such that due to the corresponding electrical characteristics of the termination impedance element and the twin impedance element, the termination impedance will correspond to the twin impedance.

In this document the controllable impedance elements are MOS field effect transistors, with the gate acting as the impedance control input. With such semiconductor impedance elements, the following disadvantage arises when the circuit has to cope with a larger range of different operating voltages.

In order to allow the circuit to operate properly at the lower end of the supply voltage range, the impedance elements must have a certain minimum channel width determined by the required lowest adjustable impedance. If the supply voltage of this circuit rises, the control circuitry will generate the impedance control signal such that the impedance element substantially maintains its impedance. The large width of the impedance element in turn results in that the impedance control voltage will not rise to the same extent as the supply voltage, but will remain low. This in turn implies that the twin impedance element, and accordingly the termination impedance element no longer behaves like an impedance but rather, behaves like a current source which will not optimally terminate the transmission line. Moreover, in this current source mode, the twin impedance element and the termination impedance element will be more sensitive to variations or noise on the control signal which is a serious problem especially for circuits with a comparatively large size in a digital signal environment.

Accordingly, it is the object of the present invention to provide an improved line receiver circuit that can operate over a large operating voltage range, with the termination impedance means and the twin impedance means behaving substantially like impedances over the entire operating voltage range.

According to the present invention, this object is solved as defined in claim 1.

A line receiver circuit according to the present invention comprises a plurality of twin impedance elements which are connected together to provide the twin impedance. Each of the twin impedance elements receives an individual impedance control signal from the impedance control signal generating means. Also the termination impedance means comprises a plurality of termination impedance elements, each element having an individual impedance control input. The impedance control signal generating means includes means for providing a respective control signal for each of said termination impedance elements in a predetermined relation to the control signal for the respectively corresponding twin impedance element.

By means of providing an individual control signal to each of the impedance elements in the twin impedance means and deriving control signals for the termination impedance elements from these twin impedance control signals, the line receiver circuit according to the present invention can provide a termination impedance over a large range of power supply voltages.

The term "twin impedance element" indicates that electrical characteristics of this element are in a predetermined proportion to corresponding electrical characteristics of the associated termination impedance element. As an example, integrated semiconductor technology allows that within the same manufacturing process, different components, e.g. two transistors, are created which have substantially identical electrical characteristics, as is as such well known in the art.

Advantageous embodiments of the present invention are given in the dependent claims.

Preferably, For high supply voltages at least one of the impedance control signals will be such that the associated controllable impedance element is in a high impedance state, e.g. switched off, while other impedance elements are active, depending on the set target impedance value. With the supply voltage decreasing, the impedance control signals are generated such that the lower the supply voltage, the larger is the number of impedance elements which leave the high impedance state and turn active.

Preferably, the impedance elements are semiconductor components, and preferably MOSFETs or bipolar transistors. The means for generating respective control signals for each of the twin impedance elements such that the impedance of said twin impedance approximates a target value, preferably operates to inactivate as many impedance elements as possible for meeting the target impedance value. The control of each of the impedance elements can be embodied by means of providing individual control loops for each twin impedance element, the control loops being dependent from each other. Preferably, a further one of the control loops abruptly or gradually inactivates its associated impedance element as soon as the control loop or loops previously active, have reached a state where a deviation of the overall twin impedance from the target impedance value becomes too large, e.g. larger than a preset threshold. The remaining active impedance elements are respectively driven to maintain an active state of low impedance or saturation, where the differential impedance quite well approximates the absolute impedance. In this way, a satisfactorily linear behaviour of the impedance means is achieved.

Preferably, the twin impedance elements are connected in parallel to constitute the twin impedance means.

The means for generating respective control signals for each of said twin impedance elements can comprise a plurality of operational amplifiers each connected to detect a deviation of the overall twin impedance of the twin impedance means from the target value, and to control an associated one of the twin impedance elements. The operational amplifiers have different offset voltages such that with the supply voltage increasing, a sequential inactivation of the individual impedance elements can be achieved.

According to another embodiment, the means for generating respective control signals for each of said twin impedance elements comprises an operational amplifier with a plurality of output stages with different offsets. In addition or in the alternative to providing different offsets in output stages of the operational amplifier, an offset generating circuit can be provided for achieving an offset between different impedance control signals depending on the supply voltage and the target impedance value.

The impedance control signal generating means according to the present invention preferably comprises a constant current source for feeding a constant current into the twin impedance means, such that the voltage drop across the twin impedance means indicates the actual impedance value of the twin impedance means. This constant current source is preferably controlled to provide the constant current depending on the target impedance of the twin impedance means. Preferably, an additional controllable constant current source is provided for feeding a constant current into a reference resistor. The additional constant current source is controlled such that the voltage drop across the reference resistor assumes a reference value, and the current supplied by the additional current source is mirrored by the constant current source feeding the twin impedance means. A difference between the voltage drop across the reference resistor and the voltage drop across the twin impedance means can then be taken as an error signal indicating a deviation of the twin impedance from the reference impedance $R_{ref}$. This circuitry for detecting the twin impedance is advantageous in that it will provide a large error signal for a given deviation of the twin impedance from the target impedance value.

According to a preferred embodiment, a line receiver circuit comprises a plurality of input buffer sections for interfacing with a plurality of transmission lines each having its own termination impedance means. The impedance control means provides identical or corresponding control signals to each of these termination impedance means.

In the following, preferred embodiments of the present invention will be described in detail with reference to the accompanying drawings.

Figure 1:
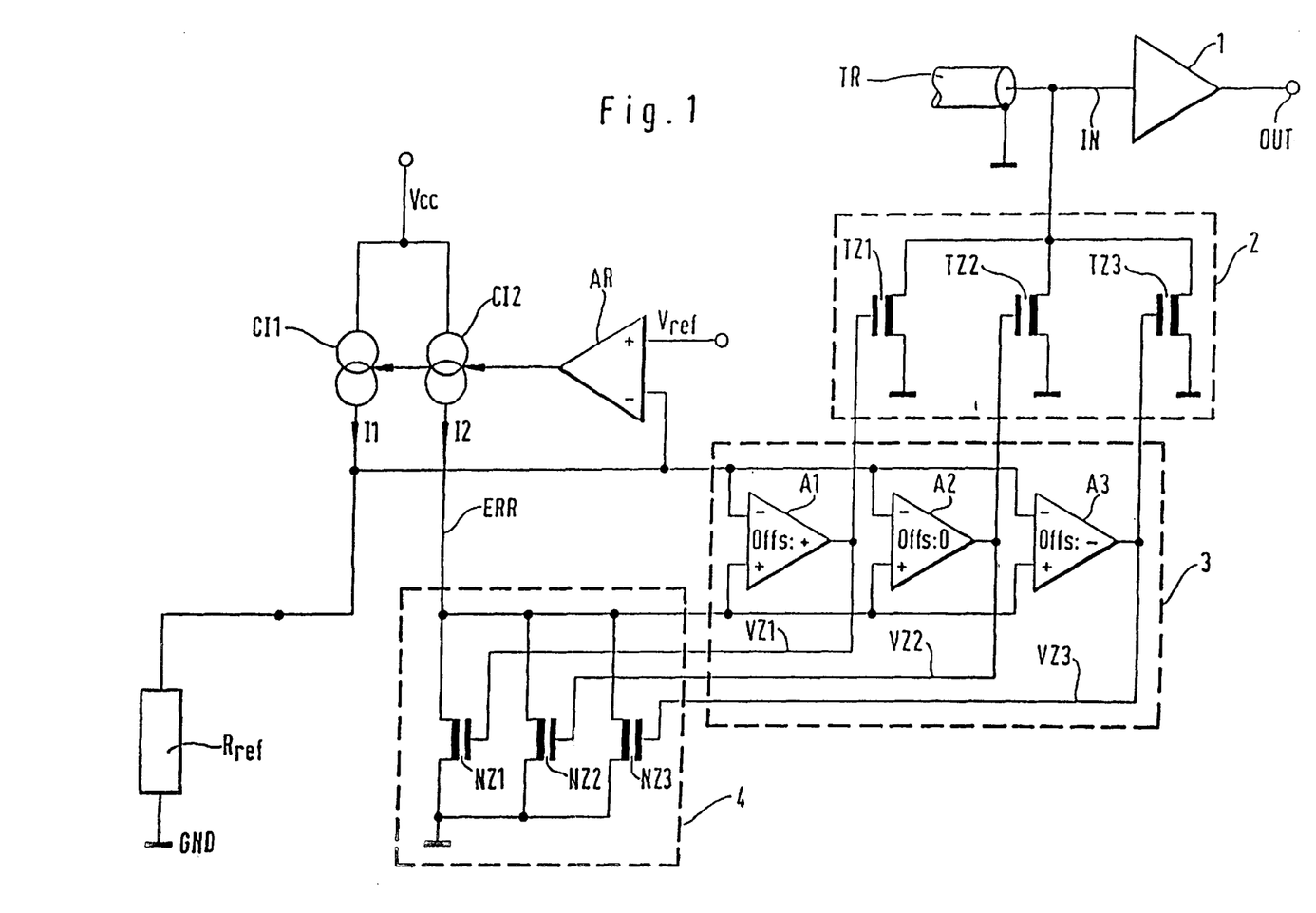
FIG. 1 shows a schematic diagram of first embodiment of a line receiver circuit according to the present invention.

FIG. 1 shows a schematic diagram of a first embodiment of a line receiver circuit according to the present invention. In this figure, TR denotes a transmission line connected with an input terminal IN of an input buffer amplifier 1. OUT denotes an output terminal of the buffer 1 for outputting data signals in accordance with signals received via the transmission line TR.

Reference numeral 2 denotes a line termination impedance means connected across the input of buffer amplifier 1 to terminate the transmission line TR. In this embodiment, the line termination impedance means 2 comprises three MOSFET transistors TZ1 to TZ3 the drain source paths of which are connected in parallel. Each of the transistors TZ1 to TZ3 receives at its gate an impedance control signal generated by an impedance control signal generating means 3. The impedance control signal generating means 3 of this embodiment comprises operational amplifiers A1 to A3 for providing individual impedance control signals at their respective outputs. The input offset voltages of the three amplifiers A1 to A3 are different from each other. The reason for this will be explained further below. The internal structure of each of the operational amplifiers A1 to A3 can be conventional. It is well known in the art how to compensate the input offset voltage of operational amplifiers. The same mechanisms can be applied for achieving different input offset voltages. One possibility among many others is, to provide the transistors constituting the differential input stage of the respective operational amplifier asymmetrical, e.g. with physical dimensions different from each other.

Reference numeral 4 denotes a controllable twin impedance means. In this embodiment, the controllable twin impedance means comprises three MOSFET transistors NZ1 to NZ3 the drain source paths of which are connected in parallel. Each of the transistors NZ1 to NZ3 receives at its gate an individual control signal for controlling the impedance of the twin impedance means 4. In the embodiment shown in FIG. 1, for each of the transistors TZ1 to TZ3 in the termination impedance means 2 an associated twin transistor NZ1, NZ2 and NZ3, respectively, is provided. Each pair of twin transistors receives at their gates an impedance control signal from the associated one of the amplifiers A1 to A3. The term "twin transistor" indicates that the dependency of the impedance of the drain source paths on the drain source voltage and the gate control voltage is substantially identical for both twin transistors. It is well known in the art as such that twin transistors can be achieved by means of manufacturing the transistors within the same process and with a substantially identical geometry. In general, the electrical characteristics of twin transistors need not be identical but it is sufficient that corresponding electrical characteristics of both transistors are in a known, predetermined relationship with each other. This is e.g. the case if the channel dimensions of one of the twin transistors are a predetermined multiple of the corresponding channel dimensions of the other twin transistor. Also for such and similar cases the term "twin" shall be applicable.

$R_{ref}$ denotes a reference resistor for setting an impedance value to be assumed by line termination impedance means 2. The reference resistor $R_{ref}$ can be provided as an internal component, or preferably, can be connected externally such that transmission lines with different characteristic impedances can be terminated simply by means of adjusting $R_{ref}$.

CI1 and CI2 denote controllable current sources providing a constant current I1 and I2, respectively, depending on a current control signal provided at the output of an operational amplifier AR. In the embodiment of FIG. 1, both constant current sources CI1 and CI2 receive the same control signal from the amplifier AR. The current sources CI1 and CI2 constitute a current mirror. That is, in the ideal case the amount of the current I1 is in a fixed predetermined relation to the amount of the current I2. For instance, the current I1 and the current I2 are equal. Current mirror circuits of this kind are well known in the art as such. CI1 can e.g. be embodied with a PMOS FET having its gate and drain connected together and with the output of amplifier AR. CI2 can be a PMOSFET having its gate connected with the output of amplifier AR.

The constant current source CI1 is connected such that the constant current I1 flows through the reference resistor $R_{ref}$. The constant current source CI2 is connected such that the constant current I2 can flow through the twin impedance means 4. The inverting inputs of the operational amplifiers A1 to A3 and AR are connected such that they receive the voltage drop across $R_{ref}$. The noninverting inputs of the three amplifiers A1 to A3 are connected to receive the voltage drop across the twin impedance means 4 caused by the current I2.

$V_{ref}$ denotes a reference voltage applied to the noninverting input of the operational amplifier AR. This reference voltage can be provided by means of a simple resistive voltage divider circuit (not shown) or preferably, by means of a constant voltage source outputting a constant reference voltage which is e.g. a fifth to a third of the lowest admissible power supply voltage. Preferably but not necessarily, Vref is approximately equal to the signal voltage across the line termination impedance means 2. Vcc denotes the positive power supply potential whereas GND denotes the ground potential.

In operation, the reference resistor $R_{ref}$, the constant current source CI1 and the operational amplifier AR constitute a control loop for generating a constant current I1 depending on the reference resistor $R_{ref}$. Since the current sources CI1 and CI2 constitute a current mirror, the current I2 similarly depends on the reference resistor $R_{ref}$. In particular, the operational amplifier AR adjusts the constant current I1 provided by the current source CI1 through the reference resistor $R_{ref}$ such that the voltage drop across $R_{ref}$ at the negative input of AR equals the reference voltage $V_{ref}$ at the noninverting input of the operational amplifier AR.

Due to the predetermined relation between I2 and I1, the deviation labeled ERR of the voltage drop across the twin impedance means 4 from the voltage drop across the reference resistor $R_{ref}$ indicates a deviation of the twin impedance from a target impedance value. The ratio between this target impedance value and $R_{ref}$ is the predetermined ratio of I1 to I2.

The impedance control means 3 serves to provide individual control signals to each of the twin impedance elements NZ1 to NZ3 such that this deviation of the impedance of the twin impedance means from the target impedance value approaches zero. Then, also the impedance of the termination impedance means 2 will take the desired value because the termination impedance elements TZ1 to TZ3, respectively, receive the same impedance control signals as their associated twin impedance elements NZ1 to NZ3.

The impedance control means 3 is designed such that there exists an offset between the impedance control signals VZ1 to VZ3. This offset serves to ensure that as many of the twin impedance elements NZ1 to NZ3 as possible, and accordingly, as few termination impedance elements TZ1 to TZ3 are active, and that among all active elements as many as possible are in a state of lowest possible impedance, e.g. in a saturated state because in this state the linearity of the impedance elements, e.g. MOSFETs or bipolar transistors, is best.

For the purpose of explaining the operation of the embodiment shown in FIG. 1, it is assumed that the supply voltage Vcc increases. For the sake of simplicity it is assumed that I1 is equal to I2.

For supply voltages at the lower end of the supply voltage operating range of the circuit shown in FIG. 1, the impedance of the twin impedance means 4 will be higher than $R_{ref}$ even if the three control voltages VZ1 to VZ3 take the maximum possible value (Vcc or less, depending on the particular design of the output stages of the amplifiers A1 to A3). Accordingly, the voltage drop across the twin impedance means 4 will be larger than the voltage drop across $R_{ref}$ such that all impedance elements NZ1 to NZ3 are in a state of lowest possible impedance.

With the supply voltage Vcc rising, also the potentials at the gates of the transistors NZ1 to NZ3 will rise. This in turn results in the impedance of the twin impedance means 4 getting lower. As a consequence, with Vcc rising the error signal, i.e. the voltage difference across the noninverting inputs and the inverting inputs of the amplifiers A1 to A3 decreases, and with Vcc further increasing, inverts its sign.

Due to the three amplifiers A1 to A3 being provided with different input offset voltages, the amplifier A3 with the most negative input offset voltage will be the first to lower the voltage VZ3 at its output and accordingly, will gradually or abruptly turn off the impedance element NZ3 and similarly the termination impedance element TZ3, while the other amplifiers A1 and A2 will keep their associated impedance elements fully on, i.e. in a state of lowest possible impedance.

With the supply voltage Vcc increasing further, also the second amplifier A2 with an input offset voltage more positive than the input offset voltage of A3 but lower than the input offset voltage of A1, will eventually turn off its associated impedance elements NZ2 and TZ2 while the impedance elements associated with amplifier A1 will still remain in the linear region.

From this it is apparent that the impedance control signal generating means 3 is adapted to control the impedance of the twin impedance means 4 and correspondingly the impedance of the termination impedance means 2, by controlling the number of impedance elements in the linear operating region. In this way, a linear behaviour of the termination impedance means can be achieved over a large range of operating voltages and for a large range of termination impedance values.

Figure 2A:
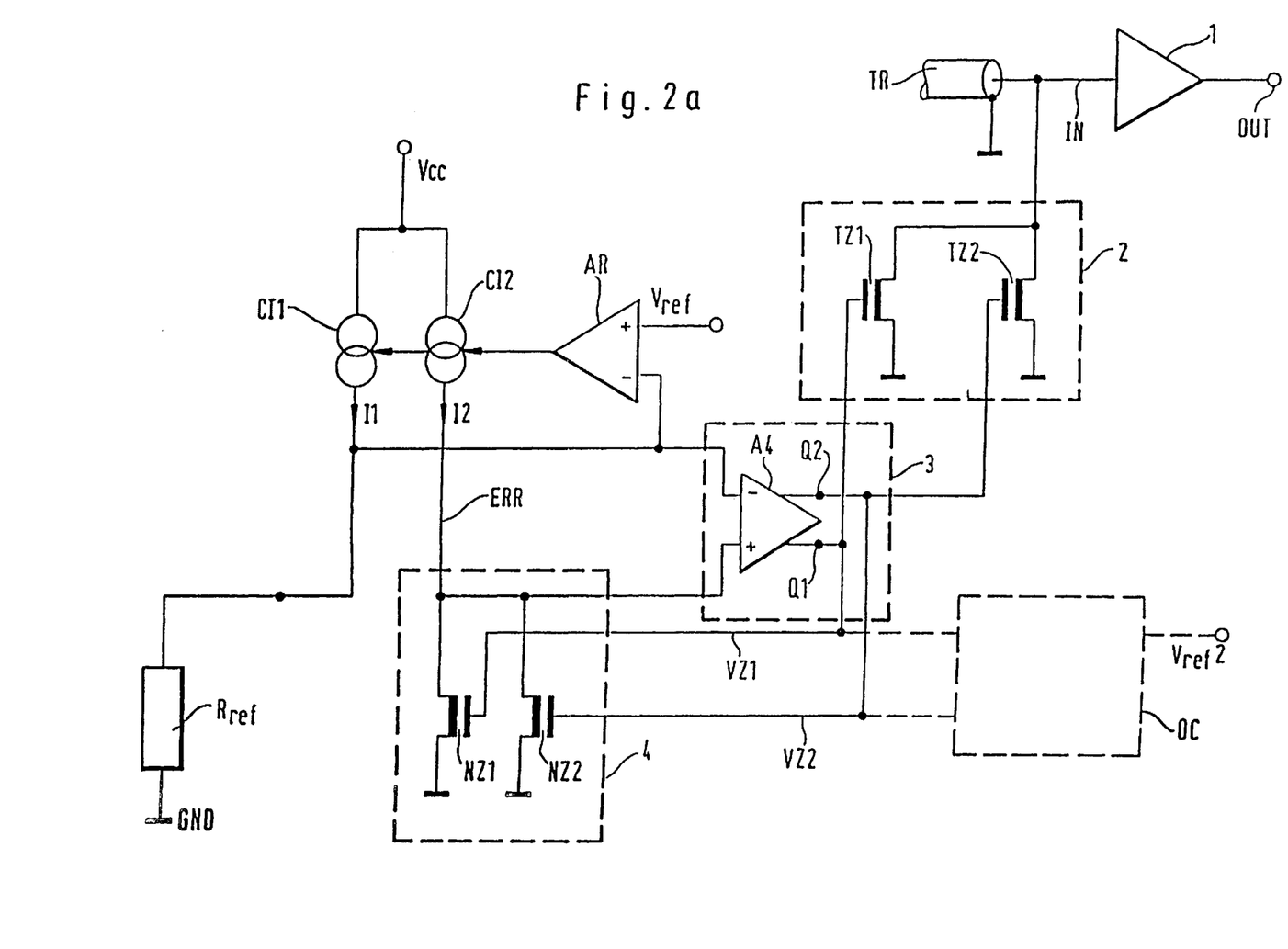
FIGS. 2a to 2e show schematic diagrams of a second embodiment and its modifications of a line receiver circuit according to the present invention.

FIG. 2a shows a second embodiment of a line receiver circuit according to the present invention. Components which are similar to or identical with corresponding components of the embodiment of FIG. 1, are denoted with the same reference numerals. Concerning the connection and function of these components, reference is made to the previous embodiment in order to avoid repetitions.

In the embodiment of FIG. 2a, the termination impedance means 2 and the twin impedance means 4, respectively, comprise two impedance elements TZ1, TZ2 and NZ1, NZ2, respectively. In general, the number of impedance elements does not matter in principle and can be chosen arbitrarily depending on the desired operating range and depending on the desired precision of the termination. The larger the number of impedance elements, the better will be the precision of the termination.

In this embodiment, the impedance control means 3 comprises an operational amplifier A4 with an inverting input connected to receive the voltage drop across the reference resistor $R_{ref}$ and with a noninverting input connected to receive the voltage drop across the twin impedance means 4. The operational amplifier A4 furthermore comprises a first output Q1 and a second output Q2. The first output Q1 is connected to provide an impedance control signal VZ1 to the twin impedance element NZ1 and to the associated termination impedance elements TZ1. The output Q2 of the amplifier A4 is connected to provide an impedance control signal VZ2 to the twin impedance element NZ2 and to the associated termination impedance element TZ2. Similar to the first embodiment, the impedance elements included in the termination impedance means 2 and in the twin impedance means 4, are embodied as MOSFET transistors, the gates of which receiving the respective impedance control signals.

In this embodiment, the operational amplifier A4 individually adjusts the twin impedance elements NZ1 and NZ2 such that the overall impedance of the twin impedance means 4 approximates a target value. Similar to the previous embodiment, this target value is the reference impedance $R_{ref}$ multiplied by I1/I2. The amplifier A4 comprises individual output stages for each of the outputs Q1 and Q2. The output stages are designed such that there exists an offset between output Q1 and output Q2 in the dependency on the deviation of the twin impedance from the target impedance value. To explain this embodiment further, in the following it is assumed that the power supply voltage Vcc increases. For the sake of simplicity it is assumed that I2 is equal to I1 such that the target impedance value of the twin impedance means 4 is the reference impedance $R_{ref}$.

At the lower end of the supply voltage operating range, the overall impedance of the twin impedance means 4 is slightly higher than the target impedance $R_{ref}$ even if both outputs Q1 and Q2 of amplifier A4 provide the highest possible output potential, i.e. Vcc or less depending on the specific design of the respective output stages. Accordingly, under these conditions both outputs Q1 and Q2 will drive their associated twin impedance elements and termination impedance elements NZ1, TZ1 and NZ2, TZ2, respectively, to be in a state of lowest possible impedance for the given supply voltage Vcc.

With the supply voltage Vcc rising, also the output voltages at the outputs Q1 and Q2 of A4 will rise, resulting in that the overall twin impedance decreases. Accordingly, the deviation of the twin impedance from the target impedance $R_{ref}$ eventually approaches zero and will then invert its sign, i.e. with Vcc increasing and all impedance elements of the twin impedance means 4 being driven to be fully on, the overall twin impedance will eventually fall below the target impedance. The potential at the inverting input of amplifier A4 will then be below the potential at the noninverting input of A4. Due to the offset behaviour of the outputs Q1 and Q2, in this situation at first one of the outputs, e.g. Q1, will lower its output potential whereas the other output e.g. Q2, will still remain at high potential. With the supply voltage Vcc further increasing, the deviation of the overall twin impedance from its target impedance value will grow further such that eventually, also the second output Q2 will start to lower its output potential. It is evident that one output after the other will eventually switch off its associated impedance elements such that the remaining active impedance elements can stay in the linear operating region.

Figure 2B:
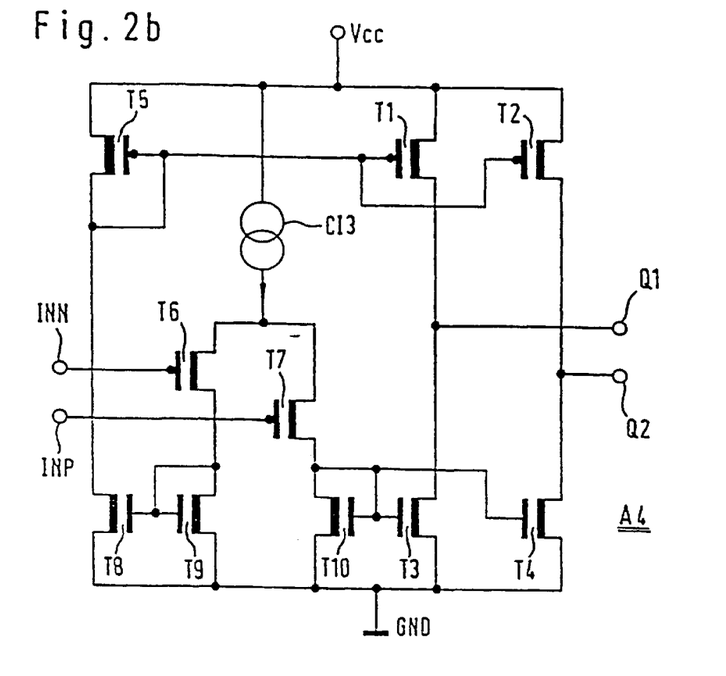

FIG. 2b shows an embodiment of the operational amplifier A4 of FIG. 2a. The operational amplifier A4 according to this embodiment comprises a current difference stage T6, T7 driven by the inverting input INN and the noninverting input INP. It furthermore comprises a plurality of output stages, e.g. two output stages T1, T3 and T2, T4, respectively. It furthermore comprises a current mirror circuit that mirrors the current through one of the branches of the current difference stage in to the upper branches of the output stages and a further current mirror circuit that mirrors the current through the other branch of the current difference stage into the lower branches of the output stages. The geometry of corresponding transistors in the output stages is provided different, such that an offset behaviour of the outputs of the two output stages is achieved.

Specifically, terminals INN and INP denote the inverting and the noninverting inputs, respectively, of the amplifier A4. Transistors T1, T2, T5, T6 and T7 are PMOSFETs whereas the remaining transistors T3, T4, T8, T9 and T10 are NMOSFETs. CI3 denotes a constant current source. The transistors T6 and T7 are connected to constitute a differential input stage. The sources of the transistors T6 and T7 are connected to the constant current source CI3. The gate of transistor T6 constitutes the inverting input INN of the amplifier A4 while the gate of transistor T7 constitutes the noninverting input INP. The drain of transistor T6 is connected with a first current mirror circuit constituted by transistors T8 and T9. Specifically, the drain of transistor T6 is connected with the drain of transistor T9 and furthermore with the gates of transistors T9 and T8. The transistors T5 and T1 constitute a second current mirror circuit. Moreover, transistor T5 constitutes a third current mirror circuit with transistor T2. The second and third current mirror circuits mirror the current through transistor T8 into the output stages of the amplifier A4, i.e. into the first output stage constituted by transistors T1 and T3 and moreover into the second output stage constituted by transistors T2 and T4. The drain of transistor T8 is connected with the drain and the gate of transistor T5 and furthermore with the gates of transistors T1 and T2.

The transistors T10 and T3 are connected to constitute a fourth current mirror circuit. Moreover, transistor T10 constitutes a fifth current mirror circuit with transistor T4 in order to mirror the current through transistor T7 into the two output stages T1, T3 and T2, T4, respectively. Specifically, the drain of transistor T7 is connected to the drain of transistor T10 and to the gates of transistors T10, T3 and T4. The drain of transistor T1 is connected with the drain of transistor T3 and constitutes the output Q1 of the amplifier A4. The drain of transistor T2 is connected with the drain of transistor T4 and constitutes the output Q2 of amplifier A4. The sources of transistors T1, T2 and T5 are connected with the positive power supply potential Vcc. The sources of the transistors T3, T4, T8, T9 and T10 are connected to ground GND. The terminal of the constant current source CI3 not connected to transistors T6 and T7, is connected to Vcc.

In order to achieve that the outputs Q1 and Q2 show an offset behaviour, physical dimensions of T1 and T2 are made different from each other, or physical dimensions of T3 and T4 are made different from each other, or both. Preferably, the physical dimensions different from each other are the channel widths of the respective elements.

In operation, a potential difference across the inverting input INN and the noninverting INP of the amplifier A4 results in a difference of the drain currents of transistors T6 and T7. The drain current of transistor T6 is mirrored by transistors T8 and T9 and appears as the drain current of transistor T5. The drain current of transistor T7 is the drain current of transistor T10. The drain voltages of transistors T5 and T10 are the input signals to each of the output stages T1, T3 and T2, T4, respectively, of the operational amplifier A4.

In the following it is assumed that the offset behaviour between the outputs Q1 and Q2 is achieved by means of providing the channel width of transistor T1 larger than the channel width of transistor T2, and by means of providing the channel width of transistor T3 smaller than the channel width of transistor T4. Then, for a given current through T5, the transistors T1 and T2 can provide different drain currents, i.e. the mirror current through T1 is larger than the mirror current through T2. Similarly, the mirror current through T3 is smaller than the mirror current through T4, given a current through transistors T7 and T10. The output potential at each of the outputs Q1 and Q2 now depends on whether the upper transistor of each output stage, i.e. T1 and T2, respectively, is driven to provide a larger current than the lower transistor of each output stage, i.e. T3 and T4, respectively, which will result in a high output potential of Q1 and Q2, respectively, or whether the respective transistor of the upper branch is driven to provide a lower current than the respective transistor of the lower branch, which would result in a low output potential at Q1, Q2, respectively. Since both upper branch transistors Ti and T2 receive the same gate signal from T5 and since both lower branch transistors T3 and T4 receive the same gate signal from T10 and due to the different channel widths of the transistors in the upper branch and in the lower branch, respectively, it requires a smaller potential difference across INP and INN for the output Q1 to turn to high potential than for the output Q2 such that different output offsets are achieved for the outputs Q1 and Q2.

While the amplifier A4 shown in FIG. 2b comprises two separate output stages, more than two output stages can be provided, corresponding to the number of impedance elements in the twin impedance means 4 and the termination impedance means 2.

In the embodiment of FIG. 2a, reference numeral OC denotes an offset circuit. This offset circuit is purely optional and can be provided in addition or in the alternative to the means in amplifier A4 for causing different offsets of the outputs of the amplifier A4.

Figure 2C:
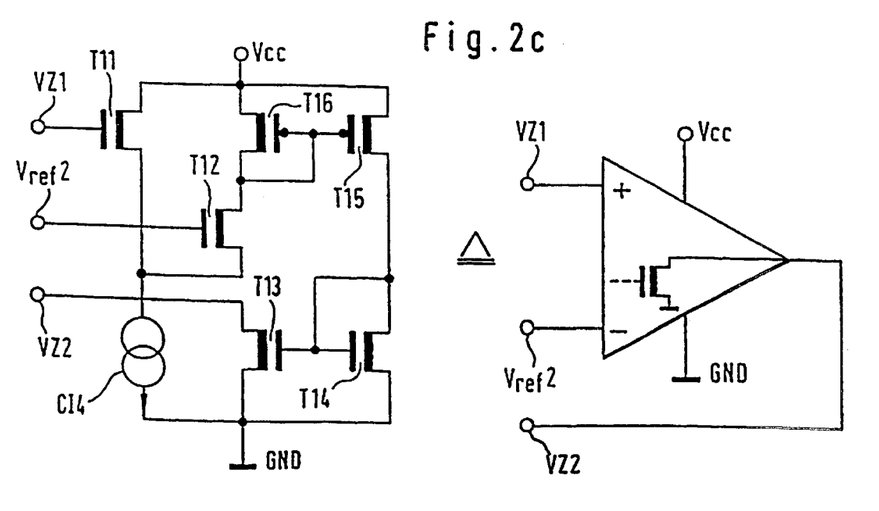

FIG. 2c shows a schematic representation and an embodiment of the offset circuit OC of FIG. 2a. From the schematic representation of the circuit OC it can be taken, that this circuit comprises a noninverting input labelled "+" and a reference input labelled "−". The circuit is designed to compare an input voltage at the noninverting input with a reference voltage at the other input. If the input voltage at "+" is higher than the reference voltage at "−" then the output of the circuit OC takes a high impedance state. Otherwise the output is pulled low to ground GND. In this FIG. 2c, CI4 denotes a constant current source. T11 to T14 denote NMOSFETs. T15 and T16 denote PMOSFETs. The sources of transistors T11 and T12 are connected together and connected with the constant current source CI4. The drain of transistor T12 is connected with the drain and the gate of transistor T16 and with the gate of transistor T15. The drains of transistor T14 and T15 are connected together and with the gate of transistor T14 and T13. The drain of transistor T13 is connected with the output Q2 of the amplifier A4 while the gate of transistor T11 is connected with the output Q1 of amplifier A4. The gate of transistor T12 receives a reference voltage Vref2. The drain of transistor T11 and the sources of transistors T15 and T16 are connected with Vcc. The sources of transistors T13 and T14 and the terminal of constant current source CI4 not connected with transistors T11 and T12 are connected to ground GND.

The offset circuit OC of FIG. 2c is suitable for enforcing different offsets of the outputs of the amplifier A4. As long as the potential at the output Q1 is lower than the reference potential Vref2, the majority of the current from CI4 will flow through the transistor T12 and will be mirrored by the current mirror T15, T16 into transistor T14. This will turn on transistor T13 which will force the output Q2 to remain low.

Only after the potential at output Q1 of amplifier A4 exceeds the reference potential Vref2, transistor T13 will be turned off such that the output Q2 can raise its potential. This is due to the fact that if Q1 is above Vref2, substantially all the current from CI4 will be taken over by transistor T11 such that there will no longer be a substantial current flow through transistor T15. As a consequence, transistors T14 and T13 are effectively turned off.

It will be appreciated that the optional offset circuit OC of FIG. 2a can either be taken to support the different offsets of each of the output stages of the amplifier A4, or can be the only means for achieving different offsets of the outputs of the amplifier A4. That is, the offset circuit OC is suitable for providing an offset behaviour at the impedance control inputs at the respective impedance elements NZ1, NZ2, . . . and the associated termination impedance elements even if the outputs of amplifier A4 on its own do not show such an offset behaviour, as is the case e.g. if the transistors T1 and T2 in FIG. 2b are not substantially different from each other and the transistors T3, T4 in FIG. 2b are not substantially different from each other.

The reference voltage Vref2 defines that potential below which VZ2 will be forced low in order to maintain the potential at VZ1 high. It is apparent that if more than two impedance elements are to be controlled individually, this can be achieved by means of cascading a number of offset circuits as shown for instance in FIG. 2d. In this figure, OC1 and OC2 denote offset circuits which can be embodied for instance as shown in FIG. 2c. R1, R2 and R3 denote resistors connected to constitute a voltage divider network in order to provide a reference voltage for each of the offset circuits OC1 and OC2. Specifically, one end of resistor R1 is connected with the positive power supply potential Vcc. The other end of R1 is connected to one end of the resistor R2 and to the reference voltage input of the offset circuit OC1. The other end of resistor R2 is connected to one end of resistor R3 and with the reference voltage input of OC2. The other end of resistor R3 is connected with ground GND.

Figure 2D:
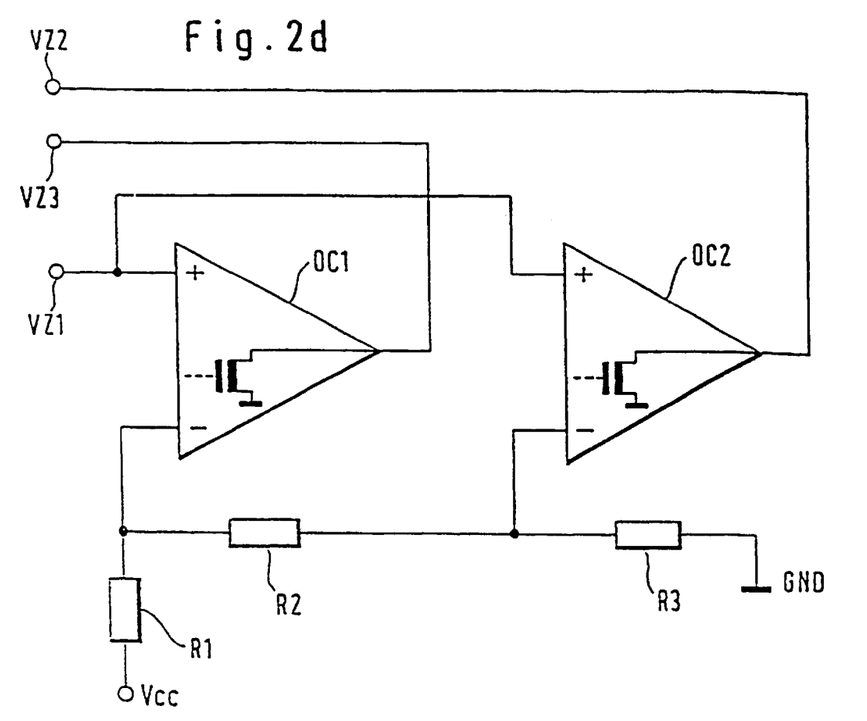

A first output Q1 providing the impedance control signal VZ1 is connected with the positive input of each of the offset circuits OC1 and OC2.

The output of the second offset circuit OC2 is connected with the second output of the amplifier A4 while the output of the first offset circuit OC1 is connected with a third output of the amplifier A4.

The resistors R1 to R3 are dimensioned such that the reference voltage applied to the first offset circuit OC1 is slightly below the maximum output voltage that can be supplied by the outputs of the amplifier A4, and such that the reference voltage applied to the second offset circuit OC2 is slightly below the reference voltage applied to OC1.

In operation, when considering the case that the power supply voltage moves from the lower limit of the operating range to the upper limit of the operating range, at the lower limit all impedance elements will be fully on such that VZ1 will be above the reference voltages applied to both offset circuits OC1 and OC2. With the power supply voltage increasing, the amplifier A4 will try to lower the impedance control voltages VZ1 to VZ3 such that VZ1 will drop below the voltage reference applied to OC1. This results in the impedance control signal VZ3 being pulled down such that VZ1 and VZ2 remain close to Vcc.

If the power supply voltage further increases, the voltages VZ1 and VZ2 will decrease and eventually reach the reference voltage applied to the second offset circuit OC2. This offset circuit will then pull down the second impedance control signal VZ2 such that the only impedance elements that remain active, are the impedance elements controlled by VZ1.

Figure 2E:
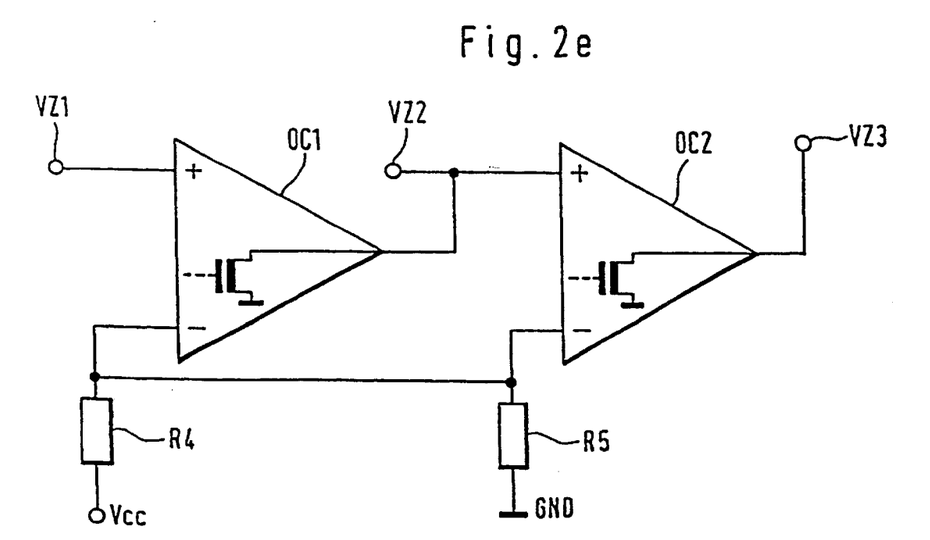

FIG. 2e shows a modification of an offset circuit for more than two individual impedance control signals VZ1 to VZ3. According to this modification, the first impedance control signal VZ1 is applied to the positive input of the first offset circuit OC1. The output of the first offset circuit is connected to the positive input of the second offset circuit OC2 and to the second output of the amplifier A4 providing the second impedance control signal VZ2. The output of the second offset control circuit OC2 is connected with a third output of the amplifier A4 providing the third impedance control signal VZ3. The negative inputs of both the first offset circuit OC1 and the second offset circuit OC2 are connected with a reference voltage obtained e.g. by means of a resistive voltage divider in the form of resistors R4 and R5. Similar to the circuit of FIG. 2d, also in FIG. 2e the offset circuits OC1 and OC2 can be embodied as shown e.g. in FIG. 2c.

Due to the fact that the output of the first offset circuit OC1 also feeds the positive input of the second offset circuit OC2, in such a cascade of offset circuits the last offset circuit of the cascade will be the first to pull its associated impedance control signal low. With the supply voltage further increasing, one impedance control signal after the other will be pulled low until the only impedance elements, that remain active, are the impedance elements controlled by VZ1. Due to the amplification of the cascade adding to the amplification of the control amplifier A4, in this embodiment it is advantageous to provide for low pass decoupling means (not shown in FIG. 2e) between the stages of the cascade.

Figure 3:
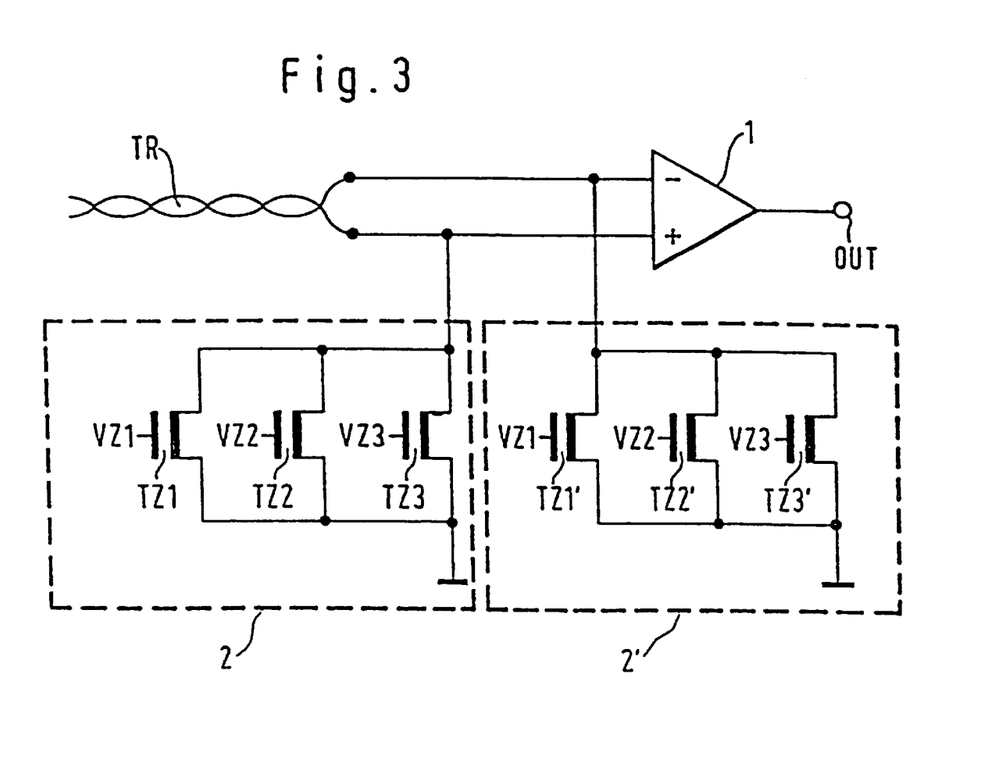
FIG. 3 shows a modification of the termination impedance means.

FIG. 3 shows a modification of the termination impedance means for terminating a symmetrical transmission line TR, e.g. a transmission line of the twisted pair type. The symmetrical transmission line connects to a noninverting input and to an inverting input of the input buffer circuit 1. For each of the inputs of the input buffer 1, a separate termination impedance means 2 and 2' is provided, each comprising a number of termination impedance elements TZ1 to TZ3 and TZ1' to TZ3', respectively. The individual termination impedance elements of each termination impedance means 2 and 2' receive individual impedance control signals VZ1 to VZ3 as shown in the figure. The transistors TZ1 to TZ3 are twins of the associated transistors NZ1 to NZ3, respectively. Similarly, the transistors TZ1' to TZ3' are twins of the associated transistors NZ1 to NZ3, respectively, such that a behaviour of the termination impedance means 2 and 2' can be achieved which is substantially identical with the behaviour of the twin impedance means 4.

Figure 4:
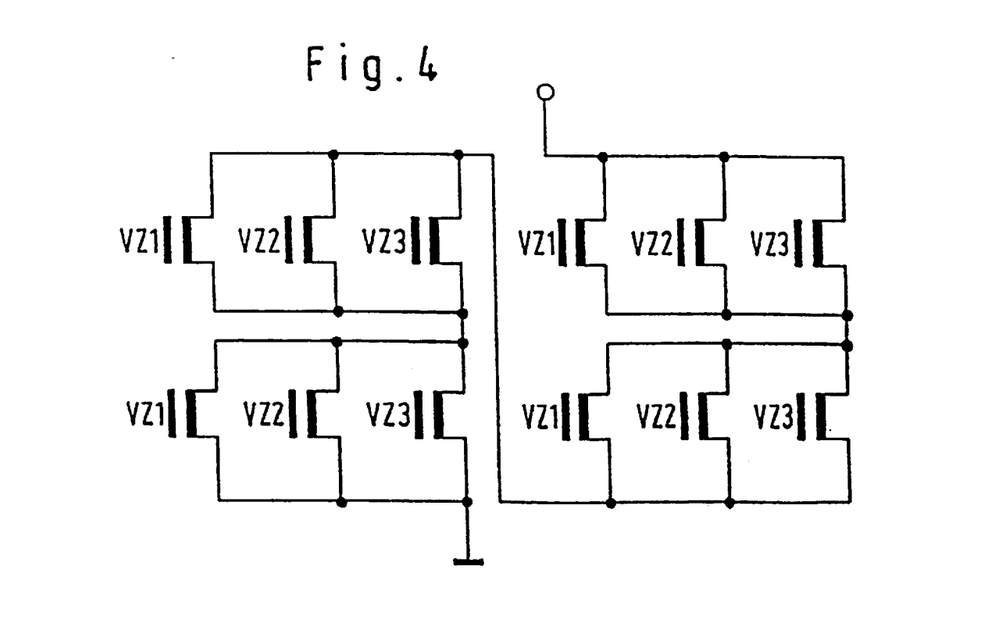
FIG. 4 shows another modification of the termination impedance means.

FIG. 4 shows a modification of the twin impedance means 4 of FIG. 1 or 2a, which modification is similarly suitable for the termination impedance means. According to the modification of FIG. 4, each twin impedance element consists of four or any arbitrary number of MOSFET transistors connected in series and receiving at their gates the same impedance control signal. Modifications of this kind can be suitable if it is desired that the corresponding electrical characteristics of the twin impedance element and the associated termination impedance element are not identical but take a predetermined and known ratio, e.g. in order to save power in the twin impedance elements. In the embodiment depicted in FIG. 4, the twin impedance element consisting of a series connection of four MOSFET transistors each receiving the same gate voltage, assumes about four times the impedance of the associated termination impedance element, under the assumption that the transistors used in the twin impedance element have the same geometrical dimensions as the transistor of the corresponding termination impedance element.

Figure 5:
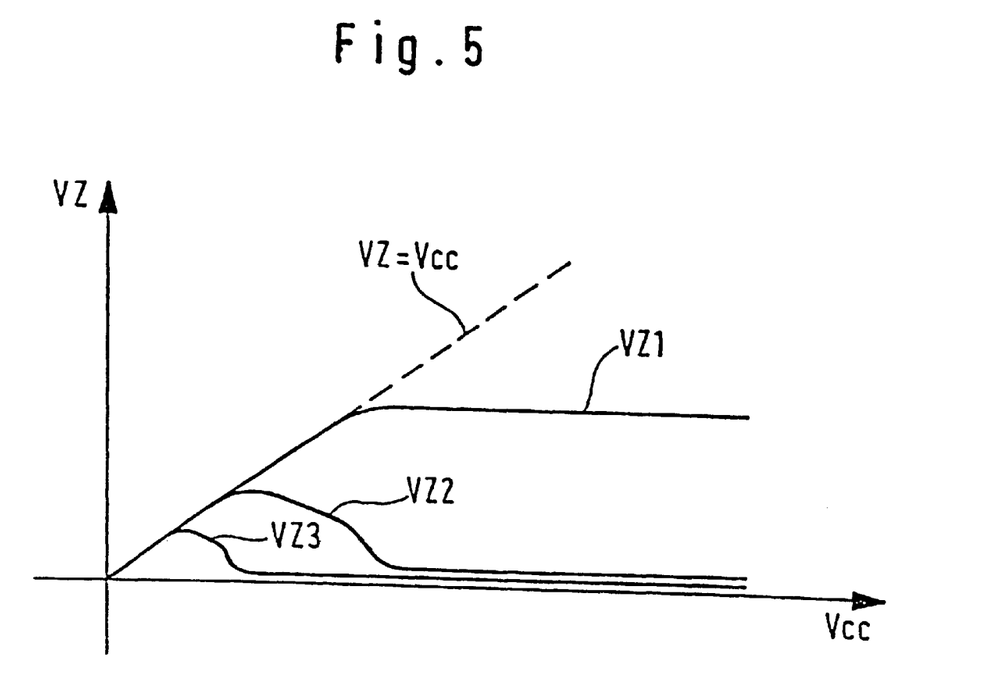
FIG. 5 shows a characteristic diagram for illustrating the operation of the embodiments of FIGS. 1 and 2.

FIG. 5 shows a diagram in order to illustrate the behaviour of the impedance control signals VZ1 to VZ3 in the embodiments of FIGS. 1 and 2 above. From this diagram it can be taken that for low operating voltages Vcc all the impedance control signals VZ1 to VZ3 keep close to the supply voltage Vcc. With the supply voltage increasing, one twin impedance element and its associated termination impedance element after the other is inactivated while the remaining impedance elements are driven to stay as much as possible in the linear operating region.

The diagram of FIG. 5 shows the behaviour for $R_{ref}$= constant. The position where each of the curves VZ1 to VZ3 leaves the proximity of the straight line Vcc depends on the set target impedance, i.e. depends on $R_{ref}$. The smaller $R_{ref}$, the higher up will be these positions in the diagram of FIG. 5.

For a person skilled in the art it is apparent that the present invention can be embodied in many different ways. Accordingly, the scope of the invention is not limited to the embodiments described above.

What is claimed is:

1. A line receiver circuit, comprising
a buffer section (1) having an input (IN) for connection with a transmission line (TR) and an output (OUT) for providing data signals in accordance with signals received through the transmission line (TR);
termination impedance mean (2) connected with the input (IN) of said buffer section (1), for terminating the characteristic impedance of the transmission line (TR), said termination impedance means (2) comprising at least two controllable impedance elements (TZ1 to TZ3) connected to provide termination impedance, each element having an individual impedance control input for receiving an impedance control signal;
impedance control means comprising
  twin impedance means (4) comprising at least two controllable impedance elements (NZ1 to NZ3) connected to provide a twin impedance, each having an individual impedance control input and having electrical characteristics in predetermined relation to corresponding electrical characteristics of corresponding impedance elements (TZ1 to TZ3) of said termination impedance means;
  means (3) for generating individual control signals for each of said twin impedance elements (NZ1 to NZ3) to control the number of twin impedance elements (NZ1 to NZ3) in an active state in which a contribution to the overall twin impedance is made, and to thereby provide a value for said twin impedance which approximates a target value;
  means (VZ1 to VZ3) for providing a respective control signal for each of said termination impedance elements (TZ1 to TZ3) in a predetermined relation to the control signal for the respectively corresponding twin impedance element (NZ1 to NZ3).

2. The line receiver circuit according to claim 1 wherein said control signal generating means (3) is adapted to provide said controls signals (VZ1 to VZ3) such that as many impedance elements (NZ1 to NZ3) as possible for said twin impedance means (4) to approximate said target impedance value, are driven to enter an inactive state in which substantially no contribution is made to the impedance of said twin impedance means (4).

3. The line receiver circuit according to claim 1 or 2, characterized in that said control signal generating means (3) comprises a plurality of control circuits (A1 to A3), each of said control circuits (A1; A2; A3) being connected to control circuits (A1; A2; A3) being connected to control an associated controllable impedance element (NZ1; NZ2; NZ3) of said twin impedance means (4);

inputs of each of said control circuits (A1 to A3) being connected to receive an error signal (ERR) corresponding to a deviation of the twin impedance from a target impedance value ($R_{ref}$);

the control circuits being connected to cooperate such as to reduce said deviation of the twin impedance from the target impedance value.

4. The line receiver circuit according to claim 3, characterized in that said control circuits are operation amplifier circuits; and the input offset voltages of said operational amplifiers are different from each other.

5. The line receiver circuit according to claim 2, characterized in that said control signal generating means (3) comprises an operational amplifier comprising an input stage having an inverting input and a non inverting input, and a plurality of output stages each connected to receive an output stage control signal from said input stage;

said inverting input and said non inverting input being connected to receive an error signal (ERR) corresponding to a deviation of the twin impedance from a target impedance value (Rref);

said output stages being connected to provide said impedance control signals for respective associated controllable impedance elements (NZ1; NZ2; NZ3) of said twin impedance means (4); and means for generating an offset between said impedance control signals.

6. The line receiver circuit according to claim 5, characterized in that said output stages have different output offsets.

7. The line receiver circuit according to claim 5 or 6, characterized in that said offset generating means is connected to receive respective output signals from said output stages and comprises a comparator for comparing a first output signal provided by a first one of said output stages with a reference value (Vref2); and means for suppressing a second output signal provided by a second output stage different from said first one, depending on the comparison by said comparator between said first output signal and said reference value (Vref2).

8. The line receiver circuit according to any one of the preceding claims, characterized by:

a first current source (CI1) for providing a current (I1) through a reference resistor ($R_{ref}$);

a second current source (CI2) for providing a current (I2) through said twin impedance means (NZ1 to NZ3);

said second current source (CI2) being connected to mirror the current (I1) generated by said first current source (CI1) to be in a predetermined proportion to the current generated by said first current source (CI1);

said impedance control signal generating means (3) being connected to receive a signal corresponding to a voltage drop across said reference resistor ($R_{ref}$) and a signal corresponding to a voltage drop across said twin impedance means.

9. The line receiver according to claim 8, characterized by said first current source (CI1) being connected to be controlled such that siad voltage drop across said reference resistor assumes a predetermined voltage Vref.

10. The line receiver circuit according to any one of the preceding claims, characterized in that said controllable impedance elements are MOSFETs.

11. A line receiver circuit comprising:

a buffer section having an input for connection with a transmission line and an output for providing data signals in accordance with signals received through the transmission line;

a termination impedance section connected to the input of said buffer section to terminate the characteristic impedance of said transmission line, said termination impedance section comprising a plurality of termination impedance elements interconnected to collectively provide a termination impedance, each of said termination impedance elements disposed to receive a control signal;

a twin impedance section operable over a voltage range including first and second voltage regions, said twin impedance section comprising a plurality of twin impedance elements interconnected to collectively provide a twin impedance which approximates a target value, each of said twin impedance elements disposed to receive a control signal and having electrical characteristics in predetermined relation to respective electrical characteristics of a corresponding one of said termination impedance elements;

a control section responsive to a voltage in said first region to couple control signals of a first set to respective twin impedance elements to direct all of said twin impedance elements to operate in a specified mode, said control section being further responsive to a voltage in said second region to couple control signals of a second set to respective twin impedance elements to direct at least one of said twin impedance elements to operate in said specified mode while deactivating at least one other of said twin impedance elements; and means for providing a respective control signal for each of said termination impedance elements in a predetermined relation to the control signal for the respectively corresponding twin impedance element.

12. The line receiver circuit of claim 11 wherein:

said specified mode of operation comprises linear operation.

13. The line receiver circuit of claim 12 wherein said control section comprises:

a plurality of control circuits, each of said control circuits being connected to control an associated controllable twin impedance elements, inputs of each of said control circuits being connected to receive an error signal corresponding to a deviation of said twin impedance from said target value, and said control circuits being respectively connected to reduce said deviation.

14. The line receiver circuit of claim 13 wherein:

said control circuits comprise operational amplifiers, the input offset voltages of said operational amplifiers being different from each other.

15. The line receiver circuit of claim 11 wherein:

each of said termination impedance elements and twin impedance elements comprises a MOSFET.

16. The line receiver circuit of claim 11 further including:

a first current source for providing a current through a reference resistor;

a second current source for providing a current through said twin impedance section;

said second current source being connected to mirror the current generated by said first current source to be in a predetermined portion to the current generated by said first current source; and said control section being connected to receive a signal corresponding to a voltage drop across said reference resistor and a signal corresponding to a voltage drop across said twin impedance section.

* * * * *